United States Patent [19]

Tsai

[11] Patent Number: 5,469,138
[45] Date of Patent: Nov. 21, 1995

[54] DANGER DETECTOR-TYPE AUTOMATIC CONTROL DEVICE

[76] Inventor: Hsin-Tan Tsai, No. 50-8, Fu-Hsing St., Hua-Lien City, Taiwan

[21] Appl. No.: 69,301

[22] Filed: May 28, 1993

[51] Int. Cl.⁶ .............................. B60Q 9/00; B60R 21/00
[52] U.S. Cl. ........................ 340/500; 340/436; 180/271; 180/275
[58] Field of Search ........................ 340/500, 540, 340/435, 436, 903; 180/271, 272, 274, 275, 277; 49/31

[56] References Cited

U.S. PATENT DOCUMENTS

| | | | |
|---|---|---|---|
| 3,818,635 | 6/1974 | Morita | 49/2 |
| 4,129,811 | 12/1978 | Pearson | 318/478 |
| 4,237,654 | 12/1980 | Landem et al. | 49/141 |
| 4,381,829 | 5/1983 | Montaron | 180/274 |
| 4,424,548 | 1/1984 | Fey et al. | 361/152 |
| 4,461,501 | 7/1984 | Dumbser | 292/201 |
| 4,617,812 | 10/1986 | Rogers | 70/218 |
| 4,629,039 | 12/1986 | Imoto et al. | 188/72.1 |
| 4,633,967 | 1/1987 | Kranz | 180/274 |
| 4,658,939 | 4/1987 | Kircher et al. | 188/156 |
| 4,802,548 | 2/1989 | Kausch | 180/274 |
| 4,873,824 | 10/1989 | Cox | 60/545 |
| 4,904,880 | 2/1990 | Yoshida | 307/66 |
| 5,040,331 | 8/1991 | Merendino et al. | 49/25 |
| 5,078,456 | 1/1992 | Cox | 303/89 |
| 5,195,606 | 3/1993 | Martyniuk | 180/272 |

Primary Examiner—Edward L. Coles, Sr.
Assistant Examiner—Thomas L. Stoll
Attorney, Agent, or Firm—Limbach & Limbach; Patricia Coleman James

[57] ABSTRACT

An automatic control device includes a danger detector unit for generating a danger signal upon detection of a danger condition. A power switching unit bypasses a manual control unit of the automatic control device so as to provide a power signal from a dc power supplying unit to a driving control unit, thereby enabling the driving control unit to activate a gate driver unit for moving a roll-up gate automatically to an open position upon reception of the danger signal. The driving control unit can be used to activate an automatic brake mechanism, an automatic door opening mechanism or both when the automatic control device is installed in an automobile.

5 Claims, 3 Drawing Sheets

DANGER DETECTOR-TYPE AUTOMATIC CONTROL DEVICE

BACKGROUND OF THE INVENTION

1. Field of the Invention

The invention relates to an automatic control device, more particularly to an automatic control device which can operate automatically a roll-up gate, an automatic door opening mechanism or an automatic brake mechanism upon detection of a danger condition, such as the presence of a fire.

2. Description of the Related Art

In a conventional automatic gate control mechanism, manually operated switches are operated to control a driving control circuit so as to activate a motor in order to wind or unwind a roll-up gate. Normally, the roll-up gate serves to provide safety and security to tenants of a building. However, in the event of a danger condition, such as during the presence of a fire, the roll-up gate can hinder the escape of people from the building, thus causing the loss of many lives. For example, when the line power to the building is cut-off automatically due to the presence of a fire, the conventional gate control mechanism cannot be operated so as to open the roll-up gate, thus preventing the escape of people trapped in the building.

A fire can sometimes occur when a traffic accident happens. Oftentimes, the doors of the automobile are locked and cannot be opened from the outside, thus preventing the passengers inside the automobile from being rescued.

SUMMARY OF THE INVENTION

Therefore, the main objective of the present invention is to provide an automatic control device which can operate automatically a roll-up gate, an automatic brake mechanism or an automatic door opening mechanism upon detection of a danger condition, such as the presence of a fire.

Another objective of the present invention is to provide an automatic control device which operates properly even in the absence of line power thereto.

In one aspect of the present invention, the automatic control device is to be used with a roll-up gate and comprises:

- a dc power supplying unit including a rechargeable battery unit and means for charging the rechargeable battery unit, the power supplying unit generating a power signal output;
- a manual control unit which is operable so as to generate movement signals that correspond to movement of the roll-up gate in a selected direction so as to locate the roll-up gate in a desired position;
- a gate driver unit which is activated so as to move the roll-up gate to the desired position;
- a driving control unit connected to the manual control unit and to the gate driver unit, the driving control unit receiving the movement signals from the manual control unit and activating the gate driver unit so as to move the roll-up gate to the desired position;
- a danger detector unit for generating a danger signal upon detection of a danger condition; and
- a power switching unit connected to the danger detector unit, the power supplying unit and to the driving control unit, the power switching unit receiving the danger signal from the danger detector unit and the power signal from the power supplying unit, the power switching unit bypassing the manual control unit and controlling the driving control unit so as to activate the gate driver unit and move the roll-up gate automatically to an open position upon reception of the danger signal.

In another aspect of the present invention, the automatic control device is to be installed in an automobile with an automatic brake mechanism and comprises:

- a dc power supplying unit which generates a power signal output;
- a manual control unit which is operable so as to generate movement signals for activating the brake mechanism;
- a driving control unit which is connected to the manual control unit and which activates the brake mechanism upon reception of the movement signals;
- a danger detector unit for generating a danger signal upon detection of a danger condition; and
- a power switching unit connected to the danger detector unit, the power supplying unit and to the driving control unit, the power switching unit receiving the danger signal from the danger detector unit and the power signal from the power supplying unit, the power switching unit bypassing the manual control unit and controlling the driving control unit so as to activate the brake mechanism upon reception of the danger signal.

In still another aspect of the present invention, the automatic control device is to be installed in an automobile with an automatic door opening mechanism and comprises:

- a dc power supplying unit which generates a power signal output;
- a manual control unit which is operable so as to generate movement signals for activating the door opening mechanism;
- a driving control unit which is connected to the manual control unit and which activates the door opening mechanism upon reception of the movement signals;
- a danger detector unit for generating a danger signal upon detection of a danger condition; and
- a power switching unit connected to the danger detector unit, the power supplying unit and to the driving control unit, the power switching unit receiving the danger signal from the danger detector unit and the power signal from the power supplying unit, the power switching unit bypassing the manual control unit and controlling the driving control unit so as to activate the door opening mechanism upon reception of the danger signal.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
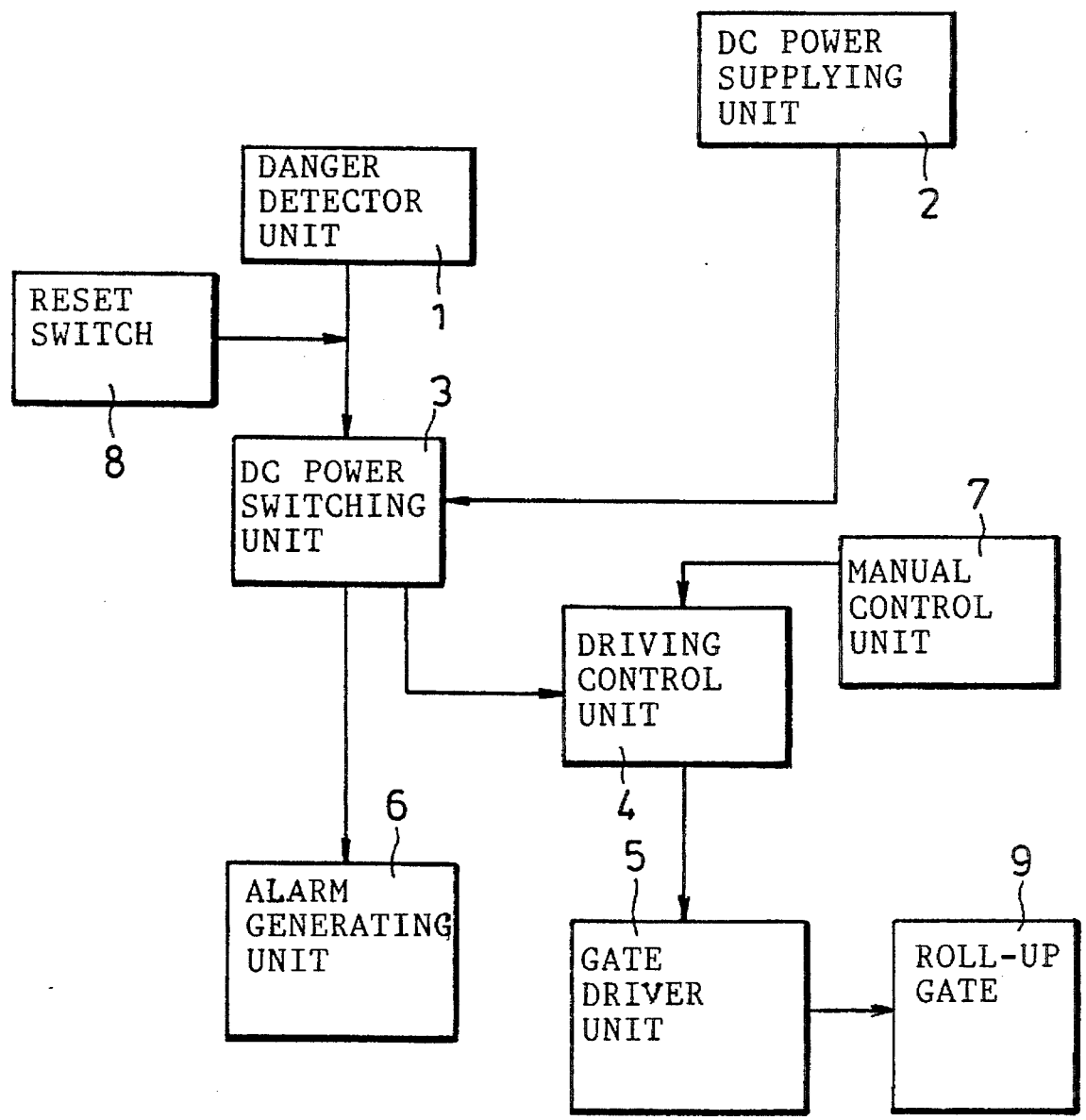
FIG. 1 is a schematic block diagram of the first preferred embodiment of a danger detector-type automatic control device according to the present invention.

Before the present invention is described in greater detail, it should be noted that like elements are indicated by the same reference numerals throughout the disclosure.

Referring to FIG. 1, the first preferred embodiment of a danger detector-type automatic control device according to the present invention is to be used with a roll-up gate (9) and is shown to comprise a danger detector unit (1), a dc power supplying unit (2), a dc power switching unit (3), a driving control unit (4), a gate driver unit (5), an alarm generating unit (6), a manual control unit (7) and a reset switch (8).

During normal conditions, the danger detector unit (1) does not generate a danger signal to the dc power switching unit (3). The dc power switching unit (3) deactivates the alarm generating unit (6) at this stage. The manual control unit (7) is operated so as to generate movement signals that correspond to opening or closing movement of the roll-up gate (9) in order to locate the roll-up gate (9) in a desired position. The movement signals from the manual control unit (7) are received by the driving control unit (4), and the driving control unit (4) activates the gate driver unit (5) to bring about the desired movement of the roll-up gate (9).

When a danger condition occurs, the danger detector unit (1) generates the danger signal to the dc power switching unit (3). Under this condition, the dc power switching unit (3) activates the alarm generating unit (6) and bypasses the manual control unit (7) so as to control the driving control unit (4) to activate the gate driver unit (5) in order to move automatically the roll-up gate (9) to an open position.

Figure 2:
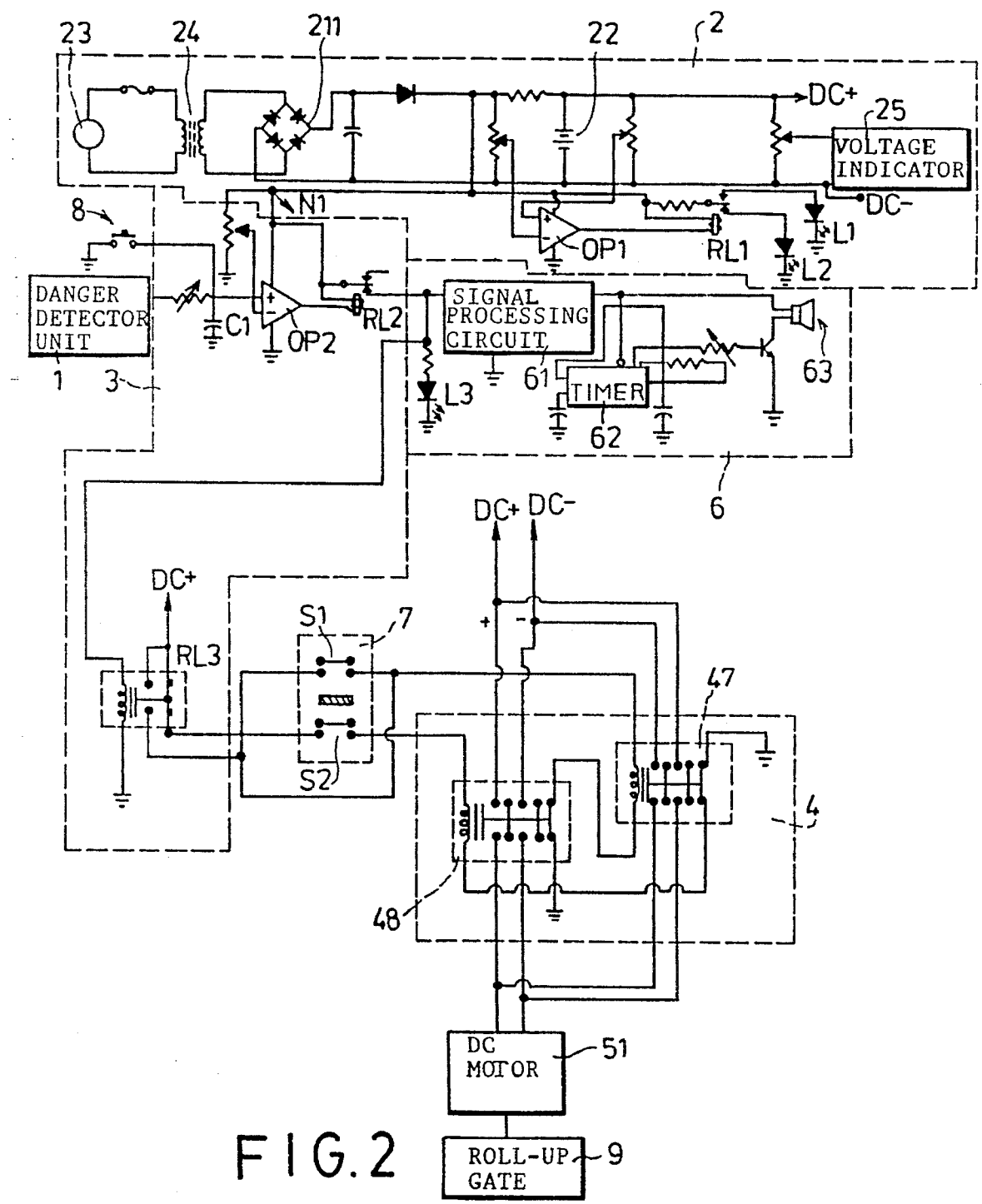
FIG. 2 is a schematic electrical circuit diagram of the first preferred embodiment.

Referring to FIG. 2, the dc power supplying unit (2) includes a transformer (24) having a primary winding connected to an ac line voltage input (23) and a secondary winding connected to a bridge rectifier circuit (211), thereby generating a dc voltage output. The power supplying unit (2) further includes a rechargeable battery unit (22) which is charged by the dc voltage output, a comparator (OP1) and a relay (RL1). Light emitting diodes (L1, L2) are activated by the relay (RL1) so as to indicate if charging of the battery unit (22) is ongoing or has been completed. A voltage indicator (25) is provided to determine if the battery voltage is normal. A power signal is obtained at node (N1) of the power supplying unit (2) and is received by the dc power switching unit (3). In the event that the line power is cut-off due to the presence of a danger condition, the rechargeable battery unit (22) provides the necessary power to permit opening movement of the roll-up gate (9).

The dc power switching unit (3) includes a comparator (OP2) which compares a reference voltage that is derived from the power signal with the output of the danger detector unit (1). Upon reception of the danger signal from the danger detector unit (1), a capacitor (C1) of the dc power switching unit (3) is charged to the high logic state. The comparator (OP2) then activates a relay (RL2) so that the power signal at node (N1) is provided to the alarm generating unit (6), thereby activating the latter. The relay (RL2) also permits the provision of the power signal at node (N1) to another relay (RL3). The relay (RL3) is responsible for providing directly the power signal to the driving control unit (4).

The alarm generating unit (6) mainly includes a danger indicator lamp (L3), a signal processing circuit (61), a timer (62) and a loudspeaker (63). The signal processing circuit (61) receives the power signal from the power switching unit (3) and generates an activating signal to activate the loudspeaker (63) and the timer (62). After a predetermined time period has elapsed, the timer (62) deactivates the loudspeaker (63).

The reset switch (8) is a discharge circuit which is operated so as to discharge the capacitor (C1), thereby resetting the automatic control device of the present invention.

As mentioned hereinbefore, the driving control unit (4) is used to control the gate driver unit (5) and mainly comprises a gate opening electromagnetic valve (47) and a gate closing electromagnetic valve (48). During normal conditions, when the UP key (S1) of the manual control unit (7) is pressed, the gate opening electromagnetic valve (47) is activated, thereby causing the gate driver unit (5) to move the roll-up gate (9) to the open position. In this embodiment, the gate driver unit (5) includes a bidirectional dc motor (51) that is connected to the driving control unit (4). When the DOWN key (S2) of the manual control unit (7) is pressed, the gate closing electromagnetic valve (48) is activated, thereby causing the gate driver unit (5) to move the roll-up gate (9) to the closed position. Thus, the operation of the automatic control device of the present invention is substantially similar to that of the conventional automatic gate control device at this stage.

When a danger condition is detected, the relay (RL3) is activated. The manual control unit (7) is bypassed so as to control directly the gate opening electromagnetic valve (47) in order to cause the gate driver unit (5) to move the roll-up gate (9) to the open position. Thus, the roll-up gate (9) does not hinder the escape of people who are trapped in a building which incorporates the automatic control device of the present invention.

When the danger condition no longer exists, the reset switch (8) is operated so as to discharge the capacitor (C1), thereby resetting the power switching unit (3). The comparator (OP2) ceases to activate the relays (RL2, RL3), thereby deactivating the alarm generating unit (6) and restoring control of the movement of the roll-up gate (9) to the manual control unit (7).

In this embodiment, the danger detector unit (1) may be a conventional fire detector, such as a smoke detector or a temperature detector, or a conventional vibration detector, such as a level-type switch. In areas where the land elevation is relatively low and flooding can easily occur, the danger detector unit may be a water level detector, thereby permitting opening movement of the roll-up gate in the event that the line power is short-circuited. Of course, some circuit modifications may be required in order to correspond with the type of danger detector unit in use. However, since such modifications can be easily accomplished by one who is skilled in the art, a detailed description of such will be omitted herein.

Figure 3:
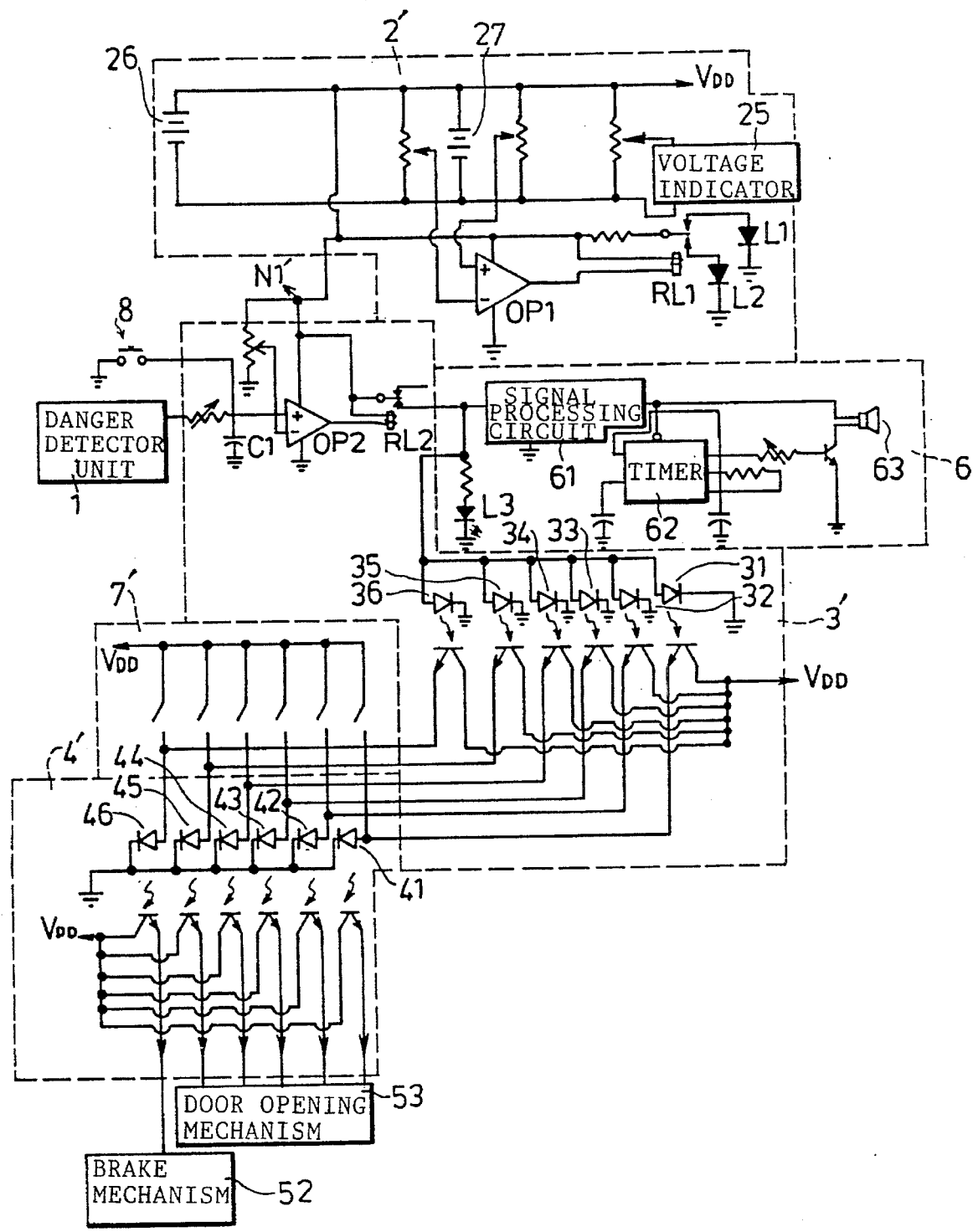
FIG. 3 is a schematic electrical circuit diagram of the second preferred embodiment of a danger detector-type automatic control device according to the present invention.

Referring to FIG. 3, the second preferred embodiment of a danger detector-type automatic control device according to the present invention is to be installed in an automobile and is shown to be substantially similar to the first preferred embodiment. In this embodiment, the dc power supplying unit (2') comprises a car battery (26) and a back-up battery (27). The car battery (26) supplies dc power for charging the back-up battery (27). A comparator (OP1) and a relay (RL1) are used to control which one of two light emitting diodes (L1, L2) is to be activated so as to indicate if charging of the back-up battery (27) is ongoing or has been completed. A voltage indicator (25) is provided in order to determine if the battery voltage is normal. A power signal is obtained at node (N1') of the power supplying unit (2') and is received by the dc power switching unit (3'). The power switching unit (3') includes six photocoupled devices (31–36). The manual control unit (7') includes six control switches. During normal conditions, any one of the six control switches of the manual control unit (7') can be operated so as to activate a corresponding one of six photocoupled devices (41–46) of the driving control unit (4'). Activation of any one of the photocoupled devices (41–46) can activate an automatic brake mechanism (52) or an automatic door opening mechanism (53) of the automobile.

Upon detection of a danger condition, the relay (RL2) activates the alarm generating unit (6'). At the same time, the photocoupled devices (31–36) of the power switching unit (3') are simultaneously activated. The manual control unit (7') is bypassed so as to activate simultaneously all of the photocoupled devices (41–46) of the driving control unit (4'), thereby activating the brake mechanism (52) and the door opening mechanism (53) of the automobile to facilitate rescue of the passengers inside the automobile.

In this embodiment, the danger detector unit (1') may be a conventional fire detector or a conventional vibration detector. If the vibration detector is in use, the vibration detector generates a danger signal to indicate that a collision has occurred when the vibrations experienced by the automobile exceed a maximum limit. The brake mechanism (52) and the door opening mechanism (53) of the automobile are activated automatically by the present invention under this condition.

The advantages and characterizing features of the danger detector-type automatic control device of the present invention are as follows:

1. The present invention generates an alarm signal upon detection of a danger condition, thereby informing the people inside the building or the passengers inside the automobile of the need to escape therefrom.

2. The present invention utilizes a dc power supplying unit to supply power thereto, thereby permitting operation of the same in the event of a power failure.

3. The present invention can be used with different types of danger detector units.

4. The present invention can facilitate rescue of passengers trapped inside an automobile.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An automobile safety device for an automobile with an automatic brake mechanism, an automatic door opening mechanism, a dc power supplying unit which generates a power signal output, a manual control unit which is operable so as to generate movement signals for activating selectively said brake mechanism and said door opening mechanism, and a driving control unit which is connected to said manual control unit and which activates selectively said brake mechanism and said door opening mechanism upon reception of said movement signals, said automobile safety device comprising:

a danger detector unit, including a fire detector, for generating a danger signal upon detection of a danger condition; and an override unit connected to said danger detector unit and to said power supplying unit and to said driving control unit, said override unit receiving said danger signal from said danger detector unit and said power signal from said power supplying unit, said override unit bypassing said manual control unit and controlling said driving control unit so as to activate simultaneously said brake mechanism and said door opening mechanism upon reception of said danger signal.

2. The automobile safety device according to claim 1, wherein said override unit includes a photocoupled unit for bypassing said manual control unit upon reception of said movement signals.

3. The automobile safety device according to claim 2, further comprising an alarm generating unit which is connected to and activated by said override unit when said override unit receives said danger signal.

4. The automobile safety device according to claim 3, further comprising a reset switch which is connected to said override unit and which is operable to reset said override unit when said danger signal is no longer present.

5. An automobile safety device for an automobile with an automatic brake mechanism and an automatic door opening mechanism, including a dc power supplying unit which generates a power signal output, a manual control unit which is operable so as to generate movement signals for activating selectively said brake mechanism and said door opening mechanism, and a driving control unit which is connected to said manual control unit and which activates selectively said brake mechanism and said door opening mechanism upon reception of said movement signals, said automobile safety device, comprising:

a danger detector unit, including a collision detector and a fire detector, for generating a danger signal upon detection of a danger condition; and an override unit connected to said danger detector unit and to said power supplying unit and to said driving control unit, said override unit receiving said danger signal from said danger detector unit and said power signal from said power supplying unit, said override unit bypassing said manual control unit and controlling said driving control unit so as to activate simultaneously said brake mechanism and said door opening mechanism upon reception of said danger signal;

an alarm generating unit which is connected to and activated by said override unit when said override unit receives said danger signal; and a reset switch which is connected to said override unit and which is operable to reset said override unit when said danger signal is no longer present, wherein said override unit includes a photocoupled unit for bypassing said manual control unit upon reception of said movement signals.

* * * * *